Oct. 17, 1944.  M. M. BERRY  2,360,542
BOOST CONTROL VALVE
Filed Dec. 14, 1940  5 Sheets-Sheet 1
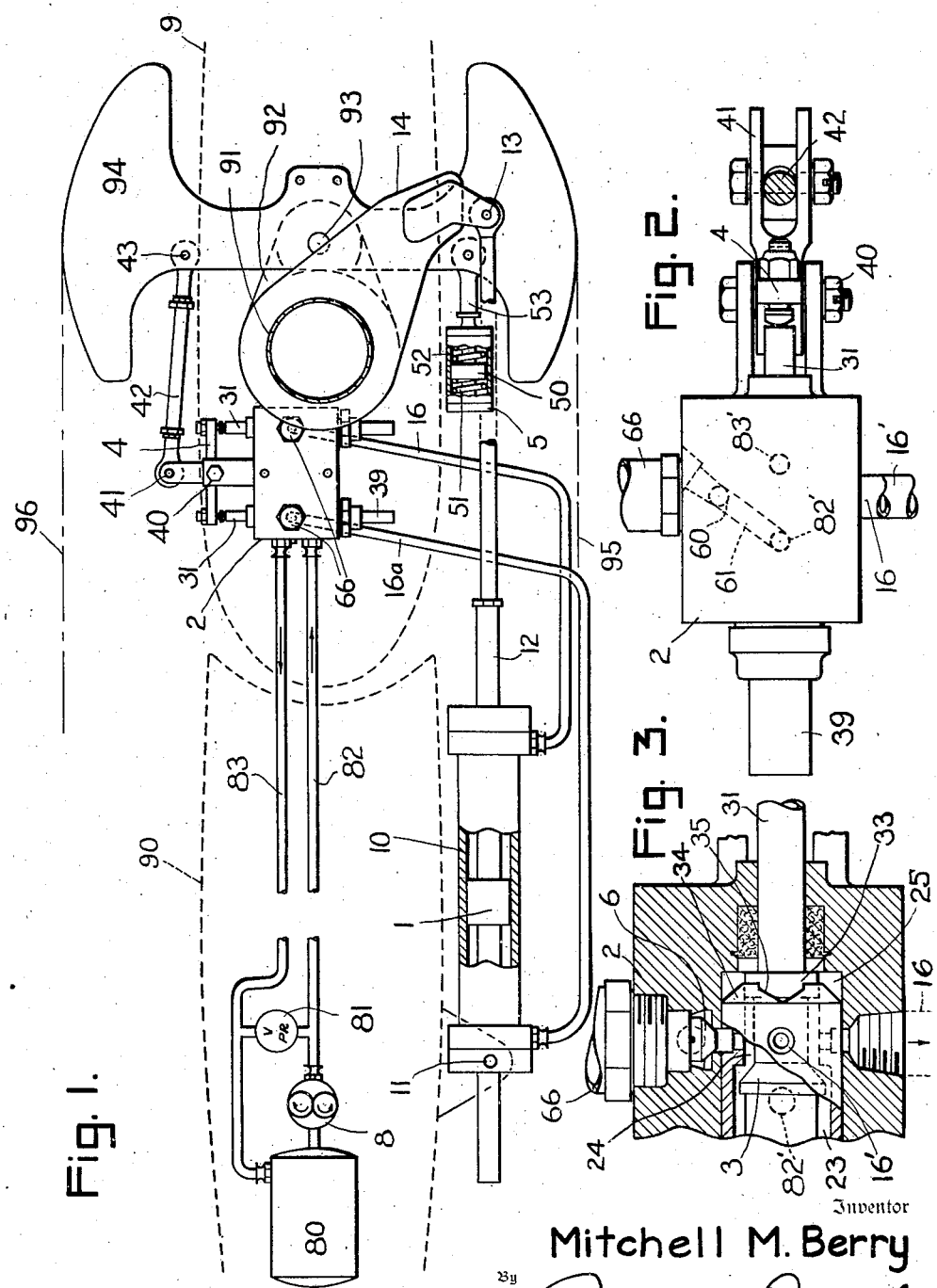
Inventor
Mitchell M. Berry
By
Reynolds & Beach
Attorneys Oct. 17, 1944.  M. M. BERRY  2,360,542
BOOST CONTROL VALVE
Filed Dec. 14, 1940  5 Sheets-Sheet 2

Inventor
Mitchell M. Berry
By Reynolds & Beach
Attorneys

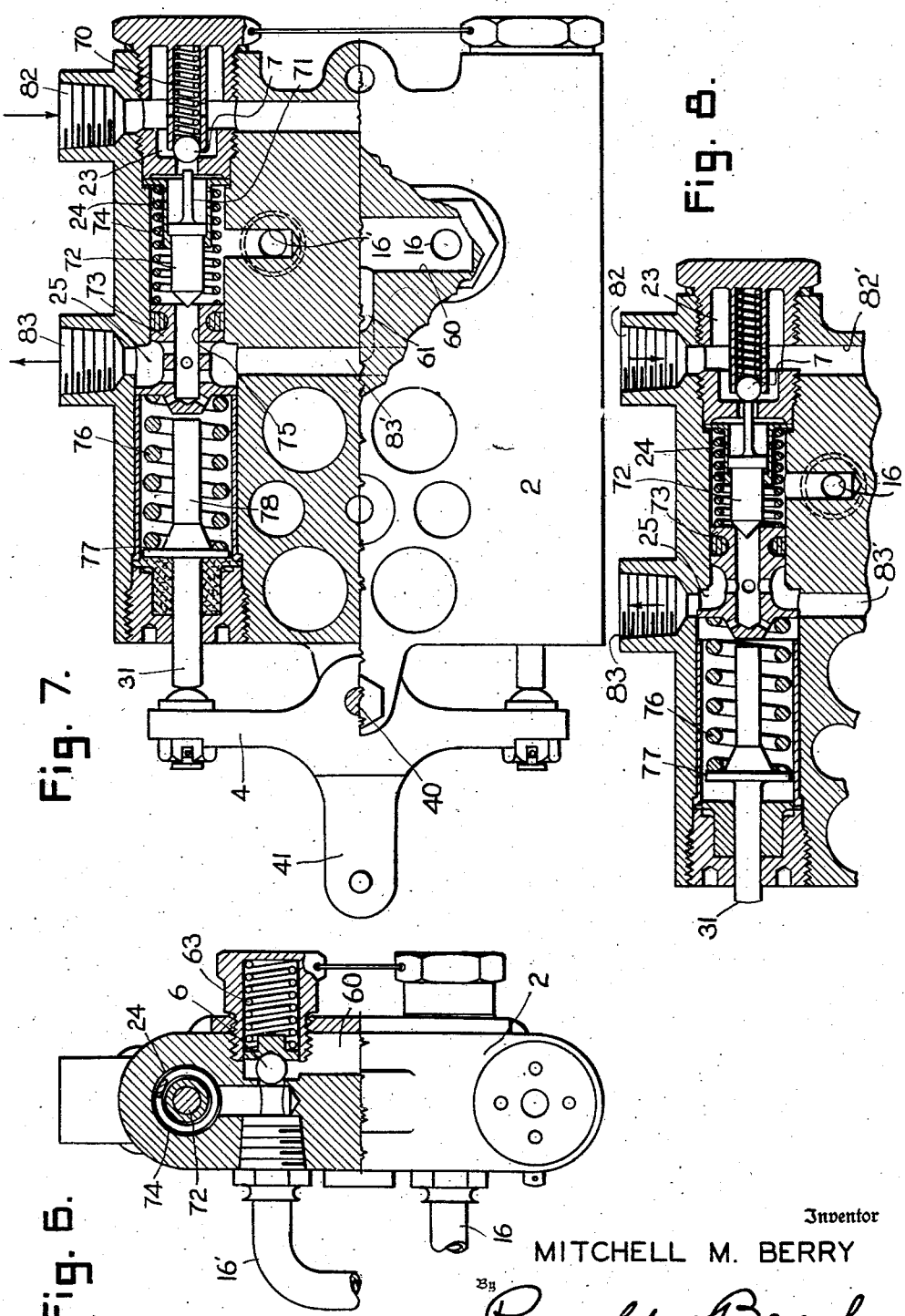

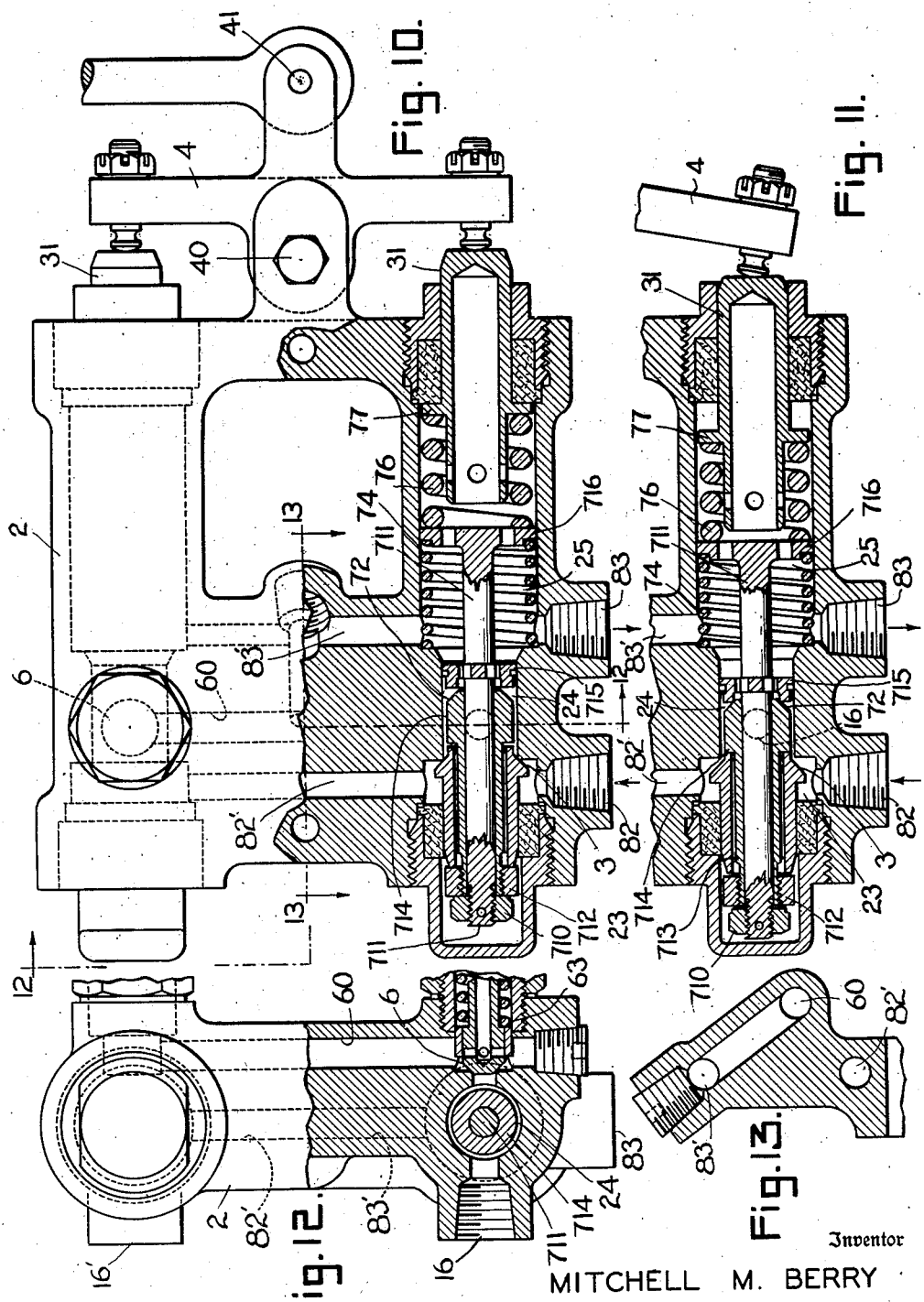

Patented Oct. 17, 1944

2,360,542

UNITED STATES PATENT OFFICE 2,360,542

BOOST CONTROL VALVE

Mitchell M. Berry, Seattle, Wash., assignor to Boeing Aircraft Company, Seattle, Wash., a corporation of Washington Application December 14, 1940, Serial No. 370,162

26 Claims. (Cl. 244—85)

Airplane control surfaces generally, and the rudder specifically, are of such size and dimensions that they are subjected to very material air loads when swung or otherwise moved from their neutral position, and hence require the employment of servo means or a booster device to multiply the relatively slight muscular force of the pilot, effective through a short distance, to effect control movement of the surface. Nevertheless it is desirable that the pilot retain the "feel" of the control surface and be able to tell, by the amount of effort required to move the rudder control, or to maintain the surface in a given position, approximately what air load is acting upon the surface, which corresponds to a predetermined deflected position of the surface at a given air speed. In other words, the pilot's muscular effort, though multiplied in effect, should be in ratio to the air load upon the surface at different angles of departure of the surface from its neutral position.

Various arrangements have been proposed to accomplish the above end, frequently electrical in nature. Some designers, however, prefer that such devices be operated by fluid pressure means, such as an hydraulic system. The present invention is therefore concerned with the provision of a booster, or boost control device, for swinging such a control surface, which for convenience may be designated the rudder, in accordance with the above principles, and by the use of a fluid pressure system, such as an hydraulic system. Such hydraulic systems now available aboard aircraft provide pressures up to at least 700 pounds per square inch, and we may assume that such a system, capable of delivering such a pressure, is available, but for the purpose of illustrating the principles of this invention it may be assumed that the boost control system required only 550 pounds per square inch to effect the desired operation of the rudder. This pressure difference is mentioned by way of explaining, in advance, a pressure relief valve which is incorporated in the embodiment about to be explained.

Since such a system must be compact, simple, and arranged in close association with the rudder which is to be controlled, I prefer that the control be effected through an hydraulic jack controlled in turn by valve means which may be mounted upon the surface itself, to swing with the latter, and which are controlled through a means, of which a mast is typical, which is mounted upon the rudder for movement with and with respect to the latter. This mast is movable under the control of the pilot, and by its movement with respect to the rudder operates the valve means in such a way as to deliver pressure to energize the jack, thereby to accomplish movement of the rudder and movement of the mast with the rudder. The device does not operate merely as a simple follow-up or ordinary telemotor system; while there is a follow-up action, the system operates in such a way that the amount of pressure delivered to energize the jack, and the amount of muscular force employed, are each proportionate to the torque of the air load on the surface, which, at a constant air speed, bears a predetermined relationship to the total deflection of the mast from its initial neutral position, under the control of the pilot, and this pressure therefore effects a given amount of movement of the rudder, until the air load built up upon the rudder by its deflection equals the pressure delivered to the jack, whereupon the movement of the rudder ceases, the forces being in equilibrium. Still the muscular force applied to the valve means remains a maximum, and is proportionate to the torque of the air load upon the deflected rudder, and to the force delivered to the jack to effect such rudder movement.

The invention will be best understood from a study of the following drawings and specification, wherein the invention is disclosed in three typical forms, and following a study of the appended claims.

Figure 1 is a diagram in the nature of a plan view, showing the complete system, with parts in the neutral position.

Figure 2 is in effect a side elevation of the control valve mechanism.

Figure 3 is in part an elevation and in part a section through a simple form of the valve.

Figure 6 is in part an elevation and in part a section through a modified form of the valve mechanism, and Figure 7 is in part a plan view and in part a section of the same form. Figure 8 is a fragmentary view, in section, similar to Figure 7, and illustrating the parts in a transitory position during operation.

Figure 10 is in part a plan view and in part a section similar to Figure 7, illustrating a balanced type of valve mechanism, with parts in the neutral position or position of rest, and Figure 11 is a fragmentary section showing the same valve parts in operative position.

Figure 5:
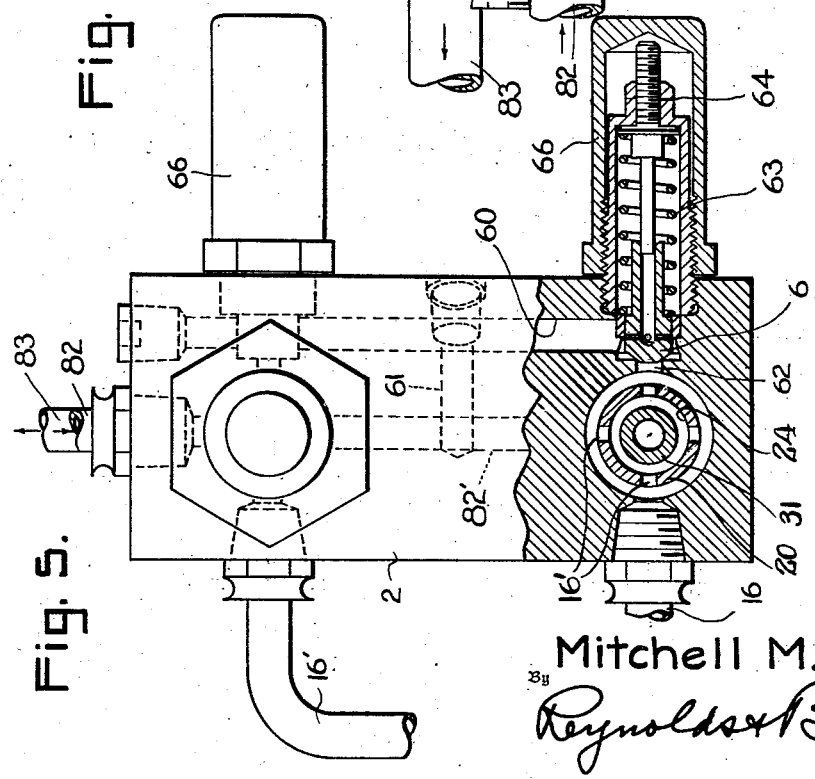
Figure 5 is a detail section through the same form of the valve mechanism, the viewpoint being at 90° to that of Figure 4.

Figure 12 is in part an elevation and in part a section, similar to Figures 5 and 6, showing the form of valve illustrated in Figures 10 and 11, taken substantially on the line 12—12 of Figure 10.

Figure 13 is a detail section taken substantially on the line 13—13 of Figure 10.

In Figure 1 is shown a fixed structure or surface at 90, and a swingable rudder 9, taken as typical of any movably or swingably mounted control surface which is to be controlled by the booster mechanism. The torque tube is indicated at 91. Rotation occurs about a suitable axis, which might be the axis of the torque tube, but which, in this installation, is the axis 93. Fast upon the torque tube is a bracket 92, upon which, at the hinge axis indicated at 93, is pivoted a mast 94. Such a mast is to be taken as typical of a member which is mounted for movement with and with respect to the rudder 9 by means such as the cables, indicated at 95 and 96, extending forwardly to the pilot's cabin. Certain of this and other mechanism to be described is illustrated as projecting outside the airfoil contours of the surfaces, but this is purely for simplification of illustration.

Reacting from the fixed part 90 of the structure is a double-acting jack consisting of a cylinder 10 and piston 1. The cylinder may be pivoted at 11, and a stem 12 extends through both heads of the cylinder, whereby the piston area against which the pressure in the cylinder ends acts may be equalized in the two ends of the jack. The stem 12 is extended to a connection at 13 with an arm 14 which is fast upon the torque tube 91. By energization of the jack in one direction or the other the rudder is swung correspondingly, the length of the lever arm being, in effect, from 13 to 93.

Mounted upon the fixed portion 90 of the aircraft structure is a pressure supply means, diagrammatically illustrated as the pump 8, the fluid supply tank 80, the by-pass valve 81 for circulation when fluid is not supplied to the boost control valve, and the pressure supply line 82 and the discharge or return line 83. These lines 82 and 83 may be sufficiently flexibly connected to communicate properly with a valve casing 2, which preferably is carried upon and swings with the rudder 9.

This valve casing and associated mechanism are shown in one form of construction in Figures 2, 3, 4, and 5. Since the jack is double acting it is necessary to employ two such valves, preferably encased in one body or casing, but operating oppositely; in general a description of one such valve will suffice to make clear the construction and operation of the entire valve means.

The valve casing 2 is provided with a continuous passage which is divided into chambers 23, 24, and 25, and within which is received a sleeve or liner 20. With the chamber 23 communicates the port 82' from the pressure conduit 82. An outlet 16 communicates with one end of the jack, and through ports 16' in the sleeve 20 communicates with the chamber 24. A low pressure passage 83' extends from the chamber 25 to the discharge or return conduit 83. Between the pressure inlet 82' and the outlet 16—that is, between the chambers 23 and 24—is a valve 3, which is normally held seated by a spring 30 within the housing 39, or the valve may be normally held closed otherwise, as by fluid pressure, or by the spring and pressure both, to block the flow of fluid from 82' either to the outlet at 16 or to the discharge at 83'. This valve has a suitably packed projecting stem 31 which extends outside the casing 2, whereby the valve may be opened under the pilot's control to admit the fluid from the pressure chamber 23 to the chamber 24, from which latter chamber the pressure fluid may pass through the ports 16' and the outlet 16 to the jack, to energize the latter, or through the discharge 83 and back to the supply tank 80. The same pressure, acting upon the interior of the stem 31, as a plunger, through ports 36, tends to hold the valve 3 closed, or to reclose it.

Since there is no appreciable back pressure in the line 83, and there is considerable resistance (the air loads upon the rudder) to energization of the jack, the pressure fluid will flow through the discharge 83, unless the latter is in some measure restricted. This restriction may be accomplished in various ways. In the arrangement shown in Figures 3, 4, and 5 a collar 33 is formed upon the stem 31, so that it moves with the valve 3. The sleeve 20 divides the annular chamber 25, formed largely by chamfering the end of ring 20 at 34, from the chamber 24 and receives the closely fitting collar 33, so that the two constitute a metering valve. The chamber 25 communicates with the discharge 8'. The chamfered sleeve end 34 is provided with one or more notches 35 (see particularly Figure 3), two being shown in Figure 4, which are increasingly restricted in size by the collar 33 as the valve 3 moves farther from its closed position, so that by this restriction of the flow of fluid into the discharge 83 the fluid is increasingly directed or caused to flow out the outlet 16, and to the jack. This in turn causes increased pressure within the jack, and increased reaction through the valve, tending to close the valve 3, assisted also by pressure within the interior of the valve 3 and stem 31, and by the action of the spring 30, and this increases the muscular force which is required to depress the stem 31 for opening of the cut-off valve 3 and for corresponding closing of the flow-controlling valve 33, 35.

The movement of the valve is effected, in the arrangement shown in Figure 1, by means of a tilting lever 4, pivoted at 40 upon the exterior of the valve casing 2, the lever having two operating ends and an intermediate arm 41, to the latter of which is connected a link 42, which connects the lever 4 to the mast 94 at 43. In this manner the pilot's control, acting directly upon the mast 94, effects directly movement of the valve 3 relative to its seat and of collar 33 relative to notches 35 in the end of sleeve 20, and thereby, to the extend of movement of the pilot's controls 95, 96, effects corresponding movement through the power means of the rudder 9 in one direction or the other.

To provide means to swing the rudder in case the power means should fail I have provided as shown in Fig. 1 the spring casing 5, including a plunger 50 and opposed springs 51 and 52, the plunger 50 being connected by a link 53 to the mast 94. Normally the springs 51 and 52 will yield as the mast is swung on its pivot 93, and since the casing 5 is mounted upon the rudder 9 it will swing with the latter. If, however, the power mechanism fails, the plunger 50 will eventually press spring 51 or 52 solid to bottom upon the end of enclosing casing 5, when the mast 94 is swung, and will thereby entrain movement of the rudder 9 to which the casing 5 is connected.

Purely as a matter of convenience, and to avoid external piping, and because the pressure intended for application at the jack is normally less than the total available pressure in the hydraulic system, which may be used for various purposes, I have incorporated within the valve means already described a relief valve as shown best in Figs. 2 and 5. This in itself forms no part of the present invention, but will be described so that the entire arrangement disclosed is better understood. A passage 60 is provided in the casing 2, connected to the discharge passage 83' by a lateral passage 61, and the passage 60 is connected to the chamber 24 opposite the outlet 16 by a port 62. A relief valve 6 is mounted to control the flow between the port 62 and the passage 60, and thence to the discharge 83. By removing the cap 66 the spring 63 may be adjusted, by screwing bolt 64 relative to its nut, as by inserting a screw driver in a slot in the exposed end of such bolt. This valve 6 permits relief when the pressure within the chamber 24 tends to exceed the maximum for which the spring 63 is set. This pressure may be, in the example given, 550 pounds per square inch, whereas the pressure available at the inlet 82 may be 700 pounds per square inch, for example.

It will be understood that two valve means, similar to the one described, are provided, one controlling the supply of pressure to the right-hand end of the jack, and the other controlling the supply of pressure to the left-hand end of the jack. By operating one or the other the jack is energized in one direction or the other, and the rudder is swung to one side or the other. The operation may be followed through a typical example to make clear the operation of the device. Assuming that the rudder is in the neutral or straight-ahead position shown in Figure 1, and that it is desired to swing it to the left, or downward as viewed in Figure 1, the pilot pulls upon the control cable 95 or its equivalent, tending to swing the mast 94 clockwise. Since the mast is independently pivoted at 93 it may swing independently of the rudder and prior to movement of the rudder, and in so doing pulls on the link 42 and depresses the right-hand valve stem 31. This opens the valve 3, and as has already been described, commences to close the notches 35. Since the restriction of these notches is but slight at the outset the pressure admitted past the valve 3 tends to flow through the notches, because of the absence of back pressure at the discharge 83, and the presence of a resisting force at the jack through which communication is had by way of the outlet 16. Moreover, the pressure admitted through 36 to the interior of the valve urges it upward in Fig. 4 and tends to close it. It will thus be seen that opening movement of valve 3 can only be accomplished by pressure on valve stem 31 sufficient to overcome the fluid pressure within the valve, the resilience of spring 30 being almost negligible. To apply such a force to valve stem 31 a corresponding or proportional force must be applied to the rudder pedal, which is transmitted to lever 4 through cables 95, 96, mast 94, and link 42. As movement of the stem 31 and the collar 33 continues in a downward direction, as viewed in Figure 4, the resistance to escape of the fluid through the notches 35 smoothly and gradually increases to a point that the resistance at the jack is in part overcome, and pressure fluid flows through the outlet 16 to the right-hand end of the jack, as viewed in Figure 1, tending to move the piston 1 to the left, and through the stem 12 swinging the mast or arm 14 in a clockwise direction, thereby swinging the rudder in the same direction, since the arm 14 is secured directly upon the torque tube 91, and in effect rotates about the hinge axis 93. Fluid in the left-hand end of the jack flows by way of the conduit 16a (analogous to the conduit 16) to the chamber 24 at the left of the valve casing, thence by way of the chamber 25 at this same side, and low pressure conduit 83, back to the source 80. The valve 33, 34 at this left-hand end of the casing 2 is not, at this time, restricted in the least, hence offers no resistance to such return flow from the left-hand end of the jack.

Figure 4:
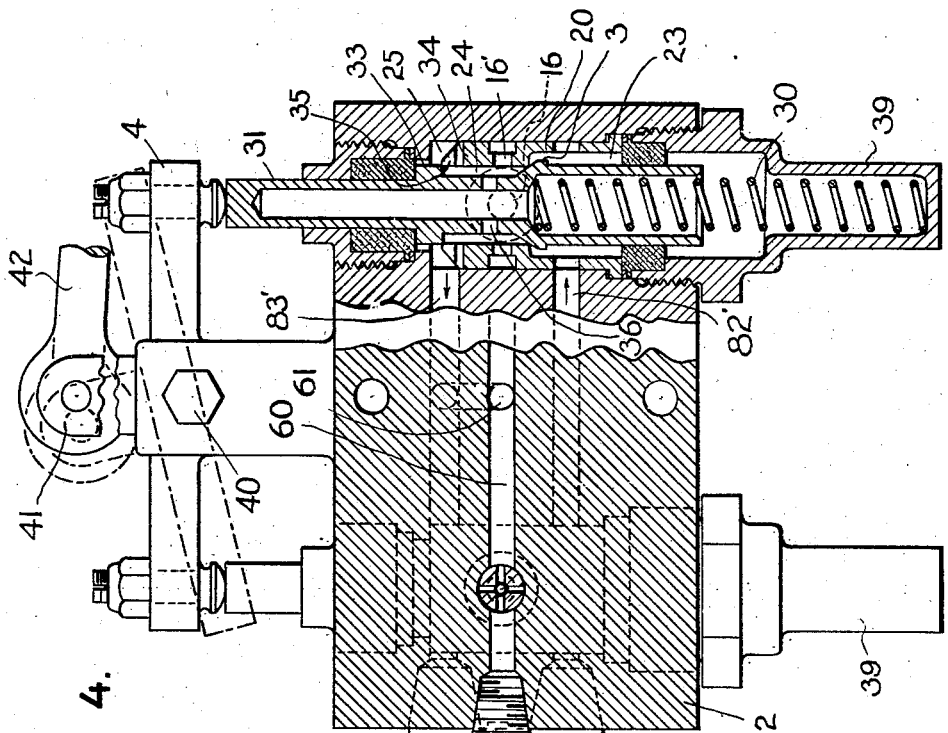
Figure 4 is in part an elevation and in part a section on two different planes through the same valve mechanism.

Since the increased movement of the jack is accomplished by greater restriction of notches 35 the stem 31 and valve 3 must be moved farther downward by operation of the rudder pedal, as shown in Figure 4. Such valve movement, however, is opposed primarily by the increased fluid pressure within the valve communicated through apertures 36, which is equal to the increased fluid pressure within the jack. Rudder pedal operation to effect such valve movement is similarly resisted through lever 4, link 42, mast 94 and cables 95, 96, so that the increase in resistance to valve movement is duplicated in the rudder pedals, and both are substantially proportional to the increase in fluid pressure. Since the internal valve area and the jack piston area subjected to equal intensity of fluid pressure are constant, the increased jack effort, bearing a direct relationship to the air load upon the control surface as stated above, also is substantially directly proportional to the force resisting the operation of the rudder pedal necessary to maintain valve 3 in the position corresponding to such fluid pressure. It follows, therefore, that the resistance to operation of the rudder pedal is substantially proportional to the air load upon the control surface, and hence to its deflection from neutral position if the air speed remains constant and the air load varies substantially in proportion to deflection. As the air load on the control surface increases by farther swinging of the control surface upon the application of greater jack effort, therefore, a corresponding increase in rudder pedal pressure will be required, which gives the pilot an increased "feel" in substantially direct proportion to such increase in air load upon the control surface.

Swinging of the rudder increases the air load upon it, consequently the resistance in the jack, and this, reacting through the outlet 16, quickly produces equilibrium, and further movement of the rudder ceases so that it remains deflected at that certain angle where, at the air speed being maintained, the air load torque equals the jack torque on torque tube 91. However, if the pull on the cable 95 is not maintained, parts will return, by reason of the air load upon the rudder, back to their initial or neutral positions. So long as the muscular effort or pull on the cable 95 is maintained, parts will remain in this position of equilibrium. If it is desired to effect further swinging of the rudder in the same direction an added muscular effort is required, which, acting through the cable 95, further moves the valve means, further restricts the notches 35, and thereby effects further movement of the rudder until parts reach a new position of equilibrium, in a further swung position of the rudder.

It has been pointed out that two valves are employed, one to control movement to the right, and one to control movement to the left. These are operated alternatively by opposite tilting of the lever 4, and the operation is the same. Pressure fluid is supplied either to the right-hand end of the jack, as viewed in Figure 1, through the outlet 16, to effect left swinging of the rudder, or to the left-hand end of the jack by way of the outlet 16a, so designated to distinguish it from the outlet 16, thereby to effect right swinging of the rudder.

Fluid pressure in excess of the pressure required to operate the jack is merely permitted to escape past the valve 6, and thence to reach the discharge 83 and return to the tank 80.

In Figures 6, 7, and 8 there is shown a further form of valve means for accomplishing similar results. In this arrangement the inlet valve 7 is held seated normally by the system pressure; a light spring 70 holds the valve closed when there is no pressure. A stem 71 projects from the outlet valve member 72 in a direction to unseat the valve 7, but when no effort is applied to stem 31 this valve member does not press upon the inlet valve 7. It may only do so when a piston 73, slidable within the chamber 24, and under no condition spaced from the outlet valve member 72 by a spring 74, is moved sufficiently to compress the spring 74 and to seat the outlet valve 72 in the end of a port 75, through which the chambers 24 and 25 communicate. A spring 76 normally bears upon one end of the piston 73. This spring 76 is materially stronger than the spring 74, and bears at its other end upon a seat 77 carried by the stem 31.

In the neutral position, shown in Figure 7, the valve 7 is seated, the valve 72 is open with relation to the port 75, and the stem 78, which is an interior extension of the stem 31, does not bear upon the end of the piston 73. To effect energization of the jack the lever 4 is rocked, the stem 31 is pressed to the right, as viewed in Figure 7, thereby acting through the stiff spring 76 to move the piston 73 to the right, until eventually the piston engages the outlet valve 72 to cut off communication with outlet chamber 25 before inlet valve 7 is opened. Continued movement of piston 73 moves valve 72 to the right, compressing the spring 74 until its stem 71 eventually engages and unseats the valve 7, as shown in Figure 8. This admits pressure to the chamber 24 through the apertures in the sleeve guiding reciprocation of valve 72, as shown in Figs. 7 and 8, which pressure immediately reacts upon the piston 73, tending to move it to the left, and permitting the valve 7 to reseat, thus trapping a part of the system pressure in chamber 24. Since chamber 24 is in communication with the jack through passage 16, the jack may move, and the reaction of the air on the deflected control surface load becomes equal to the force exerted by the jack acted upon by the trapped pressure. The effort on the rudder pedal, however, which gives the pilot the "feel" of the air load on the control surface, is the load caused by deflection of the spring 76 and the force on stem 78, opposing and in equilibrium with the trapped pressure which acts upon the piston 73, neglecting the negligible resistance offered by spring 74. If the rudder pedal is partially slacked off, the trapped pressure is lessened by escape of fluid past valve 72 into outlet chamber 25, and the air load on the rudder moves it back towards its neutral position until equilibrium is restored. The rudder pedal "feel" force is decreased correspondingly by the equal decrease in intensity of fluid pressure on piston 73. If further pressure is exerted on the rudder pedal, the still closed outlet valve 72 is moved to the right, again opening the inlet valve 7, again increasing the trapped pressure in chamber 24, and hence swinging the rudder farther from its neutral position. Simultaneously the greater force of such increased trapped pressure on piston 73 causes a correspondingly increased deflection of spring 76 or pressure on stem 78, and the resulting reaction back through link 42, mast 94 and cables 95 and 96 require that the greater rudder pedal effort be continued to maintain such increased rudder deflection. The action is smooth, and the effort is always in predetermined ratio to the air load on the rudder. The result is substantially the same as before, though attained in a slightly different manner.

Figure 9:
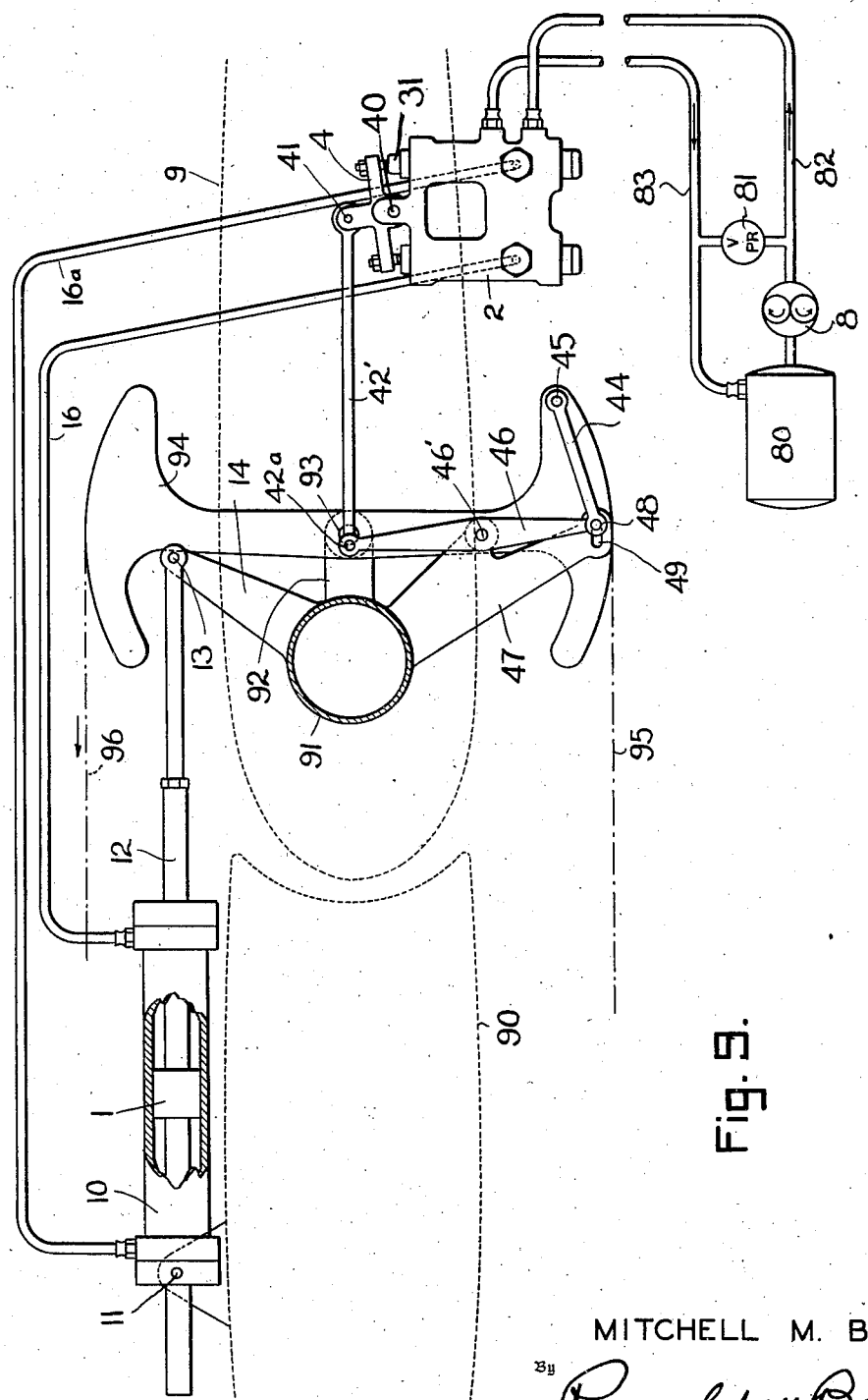
Figure 9 is a diagram similar to Figure 1, illustrating a modified arrangement of the parts, particularly in their relationship to the control surface and its manual controls.

The arrangement shown in Figure 9 is somewhat different from that shown in Figure 1, although resembling it in its general principles. In Figure 9, as in Figure 1, the mast 94 is pivoted at 93 upon an arm 92 fast to the torque tube 91, and the axis 93 coincides with the axis about which the rudder 9 swings. In the position of rest a pivot 42a, later referred to, coincides with the pivot 93. In the position of parts shown in Figure 9 the cable 96 or its equivalent has been pulled in the direction of the arrow, tending to initiate a swing of the rudder to the right, and the first result is swinging of the mast 94 about its pivot axis at 93. This displacement of the lower or left-hand end of the mast 94 acts through a link 44, which is pivoted at 45 to the mast 94, and through a lever 46 which is pivoted at 46' upon an arm 47 which is rigid with the torque tube 91, and finally through a link 42', to rock the three-armed lever 4 on its pivot axis 40, and thus to depress one of the control valves within the casing 2. The casing is mounted upon the rudder 9, in this instance, to swing with the rudder.

It will readily be seen that the pull on the cable 96 in the direction of the arrow, shown in Figure 9, will, through the linkage just described, rock the lever 4 in such a direction as will supply pressure fluid through the line 16 to the jack 10, in such a direction as to swing the rudder 9 to the right or upward, as viewed in the figure. Swinging of arm 47 by rotation of torque tube 91, effected by the effort of jacks 10 or arm 13, causes its end to swing toward pivot 45, and thus acts as a follow-up, tending to restore lever 46 and link 42', and hence lever 4, to their neutral positions notwithstanding the pull on the mast. In other words, it will tend to restore parts to their previous position of rest, though in a new position of equilibrium, of the parts, and with the rudder swung to the right a distance corresponding to the force applied to the cable 96 affording a corresponding "feel" in the rudder pedals as previously explained. In any position of rest the pivot 42a coincides with the pivot 93, wherefore any displacement of the pivot 45 is immediately reflected in movement of the lever 4.

It will be noted that the pivot 48 is received within an arcuate slot 49 in the arm 47. The slot is of such length as to permit sufficient freedom of movement of the lever 48 as will effect the necessary rocking of the lever 4 under the circumstances just recited, and normally the pin 48 will not bottom at the end of the slot 49. In the event of failure of the hydraulic mechanism to operate, the pin 48 may bottom at either end of the slot 49, and thereby will serve as a positive mechanical connection between the mast 94 and the rudder 9, inasmuch as the arm 47, which carries the slot 49, is fast upon the torque tube 91 of the rudder. This serves substantially the same purpose as the spring cartridge 5 in the form of Figure 1.

In Figures 10 to 13 inclusive there is shown a balanced valve arrangement, corresponding in all essential respects with that shown in previous figures, and functioning in substantially the same manner as that shown in Figs. 6, 7 and 8. Pressure fluid admitted at 82 or through 82' encounters first the inlet cut-off valve 3, which is in the form of a sleeve, and which is acted upon by the stop 710 upon the end of a stem 711, acting through a stop 712 upon the end of a sleeve 713, which latter is slidable upon the stem 711, and within and spaced from the sleeve which carries the valve 3. The valve 3 has a forward projection which may be engaged by an enlargement 714 on the sleeve 713, on which enlargement is formed the outlet valve 72 cooperating with a collar 715 which is carried by spokes integral with the stem 711 to form passages therebetween through the collar between chambers 24 and 25, but which is a tight fit within the bore wherein it slides. A light spring 74 acting upon a head 716 tends to pull the stem 711, hence the valve 3, to the right, and engagement of the valve 3 with its seat acts as a stop. In this position of rest the valve 72 is held from its seat upon the collar 715, but this valve may be closed by movement of the stem 711 and collar 715 to the left with respect to the valve 72 upon overcoming the negligible resistance of spring 74.

The latter movement occurs by inward pressure on the stem 31, acting through the stiff spring 76, which bears upon the enlarged head 716. Such movement has been illustrated in Figure 11. When it occurs the collar 715 seats upon valve 72 to cut off communication with the outlet chamber 25, and by further movement the valve 3 is unseated. Such movement of the collar is opposed only by the resistance of the comparatively light spring 74, pressure being transmitted through the materially stiffer spring 76, acted upon by the enlargement 77 on the stem 31. The valve 3 being unseated, pressure fluid may flow from the chamber 23 to the chamber 24, but the preceding engagement of the valve 72 and collar 715 prevents flow of such fluid into chamber 25. The extent of compression of the spring 76 depends upon the intensity of fluid pressure in chamber 24 acting upon sleeve 713 and the peripheral portion of collar 715 urging stem 711 to the right. In accordance with the degree of restriction of inlet valve 3, as in the previous form of Figures 6, 7 and 8, the pressure effective at 16 and the pressure which acts on sleeve 713 and collar 715 is determined. Since the latter force acts to compress spring 76, which in turn transmits the resulting resistance through stem 31, lever 4, mast 94, and cables 95, 96 to the rudder pedals, the effort on the pilot's controls required to maintain such spring compression again affords proper "feel" in relation to the air load on the control surface, as described above.

What I claim as my invention is:

1. In combination with a swingable aircraft control surface, such as a rudder, a double-acting fluid pressure jack connected to swing the rudder in opposition to air loads which increase with departure from neutral position, a source of pressure fluid supply to the jack, a valve interposed between said source and each end of the jack, a member operable by the pilot to move either such valve to energize the jack for swinging the rudder, and means associated with each valve, operable by movement of the corresponding valve farther away from its initial position, to resist, increasingly, operation of said member by the pilot to effect such valve movement, said valves being operatively connected to be moved reversely by the rudder as the latter moves in response to energization of the jack, the resistance of said means resisting valve moving operation of said member being established at a value related to the air load upon the rudder in its swung position, but lesser in amount.

2. In combination with a swingable aircraft control surface, such as a rudder, a double-acting fluid pressure jack connected to swing the rudder in opposition to air loads which increase with departure from neutral position, a source of pressure fluid supply to the jack, a valve interposed between said source and each end of the jack, a mast pivotally mounted for swinging, under control of the pilot, with respect to the rudder, upon an axis concentric with the rudder's hinge axis, and operatively connected to move either valve to energize the jack by pilot-initiated swinging, and means associated with each valve, operable by movement of the corresponding valve farther away from its initial position, to resist increasingly swinging of said mast by the pilot to effect such valve movement, said valves being mounted upon the rudder to move bodily therewith and reversely relative to said mast by movement of the rudder in response to energization of the jack, the resistance of said means resisting valve moving swinging of said mast by the pilot being established at a value related to the air load on the rudder in its swung position.

3. In combination with a swingable aircraft control surface, such as a rudder, booster means including a double-acting jack connected to swing the same in opposition to air loads which increase with departure from neutral position, and booster control means comprising a pressure fluid supply to the jack, a right valve and a left valve, both normally closed to intercept supply to the respective ends of the jack, pilot-operable means movable from a neutral position and operatively connected to open one or the other of said valves, according to the direction of movement, to connect the corresponding end of the jack with the pressure fluid supply, for supply of fluid thereto under pressure corresponding to the degree of movement of said pilot-operated means, and means associated with each valve subjected to the same intensity of fluid pressure as the corresponding end of said jack, and operable to increase the resistance to movement of the pilot-operated means in ratio to, but lesser in amount than, the increase in air load upon the rudder.

4. In combination with a swingable aircraft control surface, such as a rudder, a double-acting jack connected to swing the rudder in opposition to air loads which increase with departure from neutral position, and control means comprising a pressure fluid supply to the jack, a right valve and a left valve, both normally closed to intercept supply to the respective ends of the jack, and each urged toward closed position by fluid pressure in its respective end of the jack, pilot-operable means movable from a neutral position, and operatively connected to open one or the other valve, and spring means engaged with each valve, resisting such movement from neutral position, and tending to close its valve supplemental to the fluid pressure applied to the valve and affording progressively increasing resistance to valve opening movement of said pilot-operable means, in ratio to, but less in amount than, the increase in air load upon the rudder.

5. In combination with a swingable aircraft control surface, such as a rudder, a double-acting jack connected to swing the rudder in opposition to air loads which increase with departure from neutral position, and control means comprising a pressure fluid supply to the jack, a right valve and a left valve, both normally closed to intercept supply to the respective ends of the jack, pilot-operable means movable from a neutral position, and operatively connected to open one or the other valve, spring means increasingly resisting such movement with increased departure from neutral position, and tending to close said valves, and hydraulic means between each valve and the jack, operable upon opening of such valve, to decrease the hydraulic force applicable to energize the jack, in ratio to the increase in air loads upon the rudder, until equilibrium is reached.

6. In combination with an aircraft control surface movable from a position of minimum air loading to a position of maximum air loading, power means operable to develop successive added increments of force, up to a given limit, and operatively connected to move said surface until the air loads upon the surface reach equilibrium with the force then developed by the power means, control means movable to vary the force developed by said power means, pilot operable means operable to move said control means, and resisting means operable to resist operation of said pilot operable means by the pilot to move said control means for increasing the force developed by the power means, and hence to effect further movement of the control surface to a position of greater air loads, said resisting means being operatively connected to said power means for subjection to the air load reaction thereon, but in lesser degree, to increase such resistance to operation of said control means in correspondence with, but lesser in amount than, the increase in air loading upon the control surface, up to the limit of the force of the power means, or of the pilot to move the control means.

7. The combination of claim 6, wherein the power means includes a fluid-pressure-operated jack operatively connected to move the control surface, the control means includes a valve interposed between the jack and a pressure fluid source, and the resisting means includes a plunger subjected to fluid pressure equal in intensity to the pressure in said jack but having a much smaller unbalanced surface area exposed to such pressure.

8. The combination of claim 6, wherein the power means includes a fluid-pressure-operated jack operatively connected to move the control surface, and the control means includes valve means mounted upon and bodily movable with the control surface.

9. The combination of claim 6, wherein the power means comprises an hydraulic jack operatively connected to move the control surface, and the control means comprises a casing having a pressure fluid inlet, a pressure fluid discharge, and an outlet connected to the jack, and ports and passages connecting the same, a valve normally closed to block passage of fluid from the inlet to the outlet or to the discharge, opened at will by operation of the pilot operable means, and means interposed between the outlet and the discharge, and movable by the pilot-operable means in accordance with valve-opening movement, to increasingly divert the pressure fluid to the discharge, thereby decreasingly to assist departure of the control surface from neutral position, in accordance with the extent of such departure.

10. The combination of claim 6, wherein the power means comprises an hydraulic jack operatively connected to move the control surface, and the control means comprises a casing having a pressure fluid inlet, a pressure fluid discharge, and an outlet connected to the jack, and ports and passages connecting the same, a valve normally closed to block passage of fluid from the inlet to the outlet, spring means active to maintain such passage closed, means movable at will by the pilot operable means to open the valve to admit fluid under pressure to such passage, and secondary valve means controlling flow between the outlet and the discharge to reduce the proportionate flow through the discharge in ratio to movement of the valve-opening means from its valve-closed position.

11. The combination of claim 6, wherein the power means comprises an hydraulic jack operatively connected to move the control surface, and the control means comprises a casing having a passage to which admit in succession a pressure fluid inlet, a pressure fluid outlet connected to the jack, and a discharge, a valve normally closed to block flow of fluid from said inlet to the jack, means to regulate flow through said passage between the outlet to the jack and the discharge, and hence the ratio usefully applied within the jack to that wasted through the discharge, and means operable by the pilot-operable means to effect conjoint movement of said valve and said flow regulating means, to increase the relative amount applied through the outlet to the jack with increasing opening movement of the valve.

12. The combination of claim 6, wherein the power means comprises an hydraulic jack operatively connected to move the control surface, and the control means comprises a casing having a passage to which admit in succession a pressure fluid inlet, a pressure fluid outlet connected to the jack, and a discharge, a cut-off valve normally spring-held closed to block flow of fluid from said inlet into said passage, a stem projecting from said valve, to be engaged for movement by the pilot-operable means, a flow-regulating valve normally open between the jack-connected outlet and the discharge, and including an element upon said stem, and movable towards closed position in accordance with opening movement of the cut-off valve more or less, for flow to the outlet and to the discharge, and correspondingly to close the flow regulating valve to regulate the ratio of such flow through the discharge and through the outlet to the jack.

13. The combination of claim 6, wherein the power means comprises an hydraulic jack operatively connected to move the control surface, and the control means comprises a casing having a passage to which admit, in succession, a pressure fluid inlet, a pressure fluid outlet connected to the jack, and a discharge, an inlet valve normally spring-held closed to block flow of fluid from said inlet into said passage, a discharge valve and a ported piston floating in the passage between the jack-connected outlet and the discharge and cooperating to block flow to the discharge, spring means holding said discharge valve and piston separated when said inlet valve is closed, means for opening said inlet valve by closing engagement of said discharge valve with said ported piston, and means operable at will by the pilot-operable means, to effect such engagement of said discharge valve and piston to shut off communication between the jack outlet and the discharge and to establish communication between the jack outlet and the pressure fluid inlet.

14. The combination of claim 6, wherein the power means comprises an hydraulic jack operatively connected to move the control surface, and the control means comprises a casing having a passage to which admit, in succession, a pressure fluid inlet, a pressure fluid outlet connected to the jack, and a discharge, a cut-off valve normally spring held closed to block flow of fluid from said inlet into said passage, a flow-regulating valve in said passage between the jack-connected outlet and the discharge comprising a needle and a ported piston floating in the passage and cooperating with the needle to block flow to the discharge, spring means normally holding the needle unseated and the flow-regulating valve open, means associated with the needle for opening engagement with the cut-off valve, and means including a spring stronger than said first spring means, operable at will by the pilot-operable means, to move the piston towards the needle to close the flow-regulating valve, and in turn to open the cut-off valve.

15. The combination of claim 6, wherein the power means comprises an hydraulic jack operatively connected to move the control surface, and the control means comprises a casing having a passage to which admit, in succession. a pressure fluid inlet, a pressure fluid outlet connected to the jack, and a discharge, a cut-off valve normally spring-held closed to block flow of fluid from said inlet into said passage, a flow-regulating valve in said passage between the jack connected outlet and the discharge comprising a needle and a ported piston floating in the passage and cooperating with the needle to block flow to the discharge, spring means normally holding the needle unseated and the flow-regulating valve open, means associated with the needle for opening engagement with the cut-off valve, means including a spring stronger than said needle-unseating spring means, operable at will by the pilot-operable means, to move the piston towards the needle to close the flow-regulating valve, and in turn to open the cut-off valve, and means limiting compression of the strong spring under the influence of pressure applied to the piston, whereby finally to effect positive opening of the inlet valve and closure of the discharge valve.

16. In combination with an aircraft control surface, such as a rudder, movable from a position of minimum air loads through successive positions of increased air loads resisting such departure, a jack connected to the rudder so to move it, and control means interposed between the jack and a fluid pressure source comprising a valve assembly including a normally closed valve, manually operable means engaging the valve to open the same for admission of pressure to the jack, and means operable in response to pressure so admitted to the jack and thereby directly related to the reaction on said jack of the air loads upon the rudder in its position of departure, and operatively associated with the valve to resist opening movement thereof, thereby in turn to impose a variable resistance upon the manually operable means which is a factor of the total air load upon the rudder, and is equal to such manual force.

17. In combination with an aircraft control surface movable from a neutral or inactive position through successive positions of departure wherein it is subjected to progressively increasing air loads resisting such departure, a jack operatively connected to move such control surface, and a valve controlling the supply of fluid under pressure to said jack comprising a body formed with a passage divided into three chambers, a first chamber, at one end of the passage, being open to the pressure fluid supply, the second or intermediate chamber having an outlet connection to the jack, and the third chamber, at the opposite end of the passage, having a waste connection, a normally closed cut-off valve controlling communication between the first and second chambers, a metering valve which is open when parts are at rest, controlling communication between the second and third chambers, manual means to open the cut-off valve, and means operable jointly under the influence of pressure thus admitted to the second chamber, and under the opposed influence of back pressure reacting from the jack, to maintain a pressure within the intermediate chamber sufficient to move and hold the jack in a given position corresponding to a given position of the manual control means, and to load the manual control means with a force less than but corresponding to the air loads upon the control surface and reacting upon the jack.

18. In combination with an aircraft control surface movable from a neutral or inactive position through successive positions of departure wherein it is subjected to progressively increasing air loads resisting such departure, a jack operatively connected to move such control surface, and a valve controlling the supply of fluid under pressure to said jack comprising a body formed with a passage divided into three chambers, a first chamber, at one end of the passage, being open to the pressure fluid supply, the second or intermediate chamber having an outlet connection to the jack, and the third chamber, at the opposite end of the passage, having a waste connection, a normally closed cut-off valve controlling communication between the first and second chambers, a metering valve which is open when parts are at rest, controlling communication between the second and third chambers, manual means, including a plunger and a resisting spring, movable to open the cut-off valve and to close the metering valve, said plunger being arranged to be subject to the pressure prevailing in the intermediate chamber, and operatively connected to reopen the metering valve by increase of pressure within such intermediate chamber, whether arising from the pressure source or from the opposed air load reaction from the jack, to regulate the relative pressures effective at the jack and wasted through the third chamber, thereby to maintain the jack in a given position in response to maintenance of a given force upon the manual means, and a given air load upon the deflected control surface.

19. In combination with a member movable from a position of minimum resistance to displacement to a position of maximum resistance, power means so to move said member, including valve means for the control of a pressure fluid between a source of fluid under pressure and a jack which is operatively connected to said member, and thereby subjected to resistance which increases in accordance with external forces which are generally in ratio to the extent of movement induced by the supply of such fluid, said valve means comprising a casing chambered to define three chambers, a pressure fluid inlet to a first chamber, a jack-connected outlet from a second chamber, and a low pressure discharge from a third chamber, a normally closed cut-off valve disposed between the first and second chambers, a normally open metering valve between the second and third chambers, means operable to move the metering valve towards closed position, and the cut-off valve towards open position, and means to impress upon the last mentioned means a resistance which varies in accordance with the degree of pressure in the second chamber as built up jointly by the closing down of the metering valve and by the resistance to movement of the jack and of the member movable by the jack.

20. In combination with a swingable aircraft control surface, such as a rudder, a double-acting jack connected to swing the rudder in opposition to air loads which increase with departure from neutral position, and control means comprising a pressure fluid supply to the jack, a right and a left valve each adjustable by departure from its initial position to increase the effective pressure from said fluid supply at the corresponding end of the jack in response to an increase of such valve's departure from its initial position, and thereby to increase the departure of the control surface from its neutral position in opposition to the air load thereon, each of said valves including an element subjected to such effective pressure and acting directly upon its valve with a force corresponding to such pressure to resist opening of such valve, and valve moving means operable by the pilot, engageable with said valves to move one or the other valve increasingly from its initial position upon overcoming the progressively increasing opposition to increased departure of such valve effected by its element in response to the correspondingly increased effective pressure from the fluid supply.

21. In combination with a swingable aircraft control surface, such as a rudder, a double-acting jack connected to swing the rudder in opposition to air loads which increase with departure from neutral position, and control means comprising a pressure fluid supply to the jack, a right and a left valve each adjustable by departure from its initial position to increase the effective pressure from said fluid supply at the corresponding end of the jack in response to an increase of such valve's departure from its initial position, and thereby to increase the departure of the control surface from its neutral position in opposition to the air load thereon, valve moving means operable by the pilot, engageable with said valves to move one or the other valve increasingly from its initial position, said valve means being operable to subject said valve moving means to progressively increasing opposition to operation by increased departure of such valve and correspondingly increased effective jack pressure, and lost-motion means connected between said valve moving means and the rudder, operable to effect movement of the rudder by the valve moving means in the event of failure of the jack to accomplish such rudder movement within the limits of said lost-motion means.

22. In combination with a swingable aircraft control surface, such as a rudder, a double-acting jack connected to swing the rudder in opposition to air loads which increase with departure from neutral position, and control means comprising a pressure fluid supply to the jack, a right and a left valve mounted upon the rudder, to swing therewith, each adjustable by departure from its initial position to increase the effective pressure from said fluid supply at the corresponding end of the jack in response to an increase of such valve's departure from its initial position, and thereby to increase the departure of the control surface from its neutral position in opposition to the air load thereon, and valve moving means operable by the pilot, and including a member mounted upon the rudder, and movable with and with respect to the rudder, and operatively connected to the valves to move one thereof by movement of such means with respect to the rudder increasingly from its neutral position, and to permit reverse movement of that valve by its follow-up movement with the rudder.

23. In combination with an aircraft control surface movable from a position of minimum air load through successive positions of increased air load resisting such departure, a jack connected to the rudder so to move it, and control means for controlling the pressure of fluid in the jack comprising a valve assembly including a chamber, communicating with the jack, and a pressure relief port, a valve controlling communication between such chamber and the relief port urged toward open position by the fluid under pressure in such chamber, for flow of fluid from the jack communicating chamber past said valve to the relief port, and manually operable means operatively connected with said valve to move it toward closed position in opposition to the pressure of fluid in such chamber upon the valve, to restrict flow of fluid from the chamber to the relief port and thereby to increase the pressure in the chamber and the jack.

24. In combination with a swingable aircraft control surface, torque means carried by the control surface to swing it in opposition to air loads acting upon it, hydraulic jack means operatively connected to actuate said torque means, a mast pivotally mounted upon the control surface for swinging under the control of the pilot relative to said torque means, and jack control means operatively connected to said mast and to said jack means, operable by swinging of said mast relative to said torque means to actuate said jack means for moving said torque means in a direction tending to return said mast and said torque means to their initial relationship while simultaneously swinging the control surface.

25. In combination with a swingable aircraft control surface, torque means operatively connected to the control surface to swing it in opposition to air loads acting upon it, hydraulic jack means operatively connected to actuate said torque means, a mast pivotally mounted for swinging under the control of the pilot relative to said torque means, jack control means operatively connected to said jack means to actuate the same for moving said torque means in one direction or the other, a lever pivoted upon said torque means, having one end connected to said mast and the other end operatively connected to said jack control means, and swingable by swinging said mast relative to said torque means for operating said jack control means to actuate said jack means for moving said torque means in a direction tending to return said lever to its initial relationship to said torque means while simultaneously swinging the control surface.

26. In combination with a swingable aircraft control surface, a swingable arm operatively connected to the control surface for movement conjointly therewith, hydraulic jack means operatively connected to said control surface for swinging the same, jack control means operatively connected to said jack means to actuate the same for swinging the control surface, pilot-operable means, and a lever pivoted upon said swingable arm eccentrically of its axis of swing, operatively connected to said pilot-operable means and to said jack control means, for operating the latter by pilot-initiated swinging of the lever relative to said swingable arm to actuate said jack means for swinging said swingable arm in a direction tending to return said swingable arm and said lever to their initial relationship while simultaneously swinging the control surface.

MITCHELL M. BERRY.